(12) United States Patent
Roysum

(10) Patent No.: US 11,142,029 B2
(45) Date of Patent: Oct. 12, 2021

(54) TRAILER HITCH MOUNTED APPARATUS

(71) Applicant: Ronald Eric Roysum, Hopland, CA (US)

(72) Inventor: Ronald Eric Roysum, Hopland, CA (US)

(*) Notice: Subject to any disclaimer, the term of this patent is extended or adjusted under 35 U.S.C. 154(b) by 97 days.

(21) Appl. No.: 16/666,922

(22) Filed: Oct. 29, 2019

(65) Prior Publication Data
US 2020/0130441 A1 Apr. 30, 2020

Related U.S. Application Data

(63) Continuation-in-part of application No. 29/678,605, filed on Jan. 30, 2019, now Pat. No. Des. 888,617.

(60) Provisional application No. 62/752,629, filed on Oct. 30, 2018.

(51) Int. Cl.
*F16M 11/00* (2006.01)
*B60D 1/36* (2006.01)
*F16M 11/24* (2006.01)
*F16M 13/02* (2006.01)

(52) U.S. Cl.
CPC .............. *B60D 1/36* (2013.01); *F16M 11/242* (2013.01); *F16M 13/02* (2013.01)

(58) Field of Classification Search
CPC ......... B60D 1/36; F16M 11/242; F16M 13/02
See application file for complete search history.

(56) References Cited

U.S. PATENT DOCUMENTS

| | | | |
|---|---|---|---|
| 5,603,488 A | 2/1997 | O'Rourke et al. | |
| 6,059,266 A | 5/2000 | Ascherin et al. | |
| 6,935,064 B1* | 8/2005 | Thompson | F41A 23/34 |
| | | | 248/176.1 |
| 8,657,167 B2* | 2/2014 | Horyna | F41J 9/20 |
| | | | 224/519 |
| 2007/0187447 A1* | 8/2007 | Hamann | B60R 9/10 |
| | | | 224/519 |

OTHER PUBLICATIONS

"Monopod/Pulley Kit", Paratech, https://www.paratech.com/sites/default/files/paratech_brochures_rss_monobitripodkits.pdf.
"Conterra Hitch-Plate", Conterra, https://www.conterra-inc.com/products/conterra-hitch-plate.
"Instant Hitch Anchor", RescueTech1, https://www.rescuetech1.com/instanthitchanchor.aspx.

* cited by examiner

*Primary Examiner* — Amy J. Sterling

(57) ABSTRACT

Various embodiments for hitch mounted apparatuses are disclosed. In certain embodiments, the hitch mounted apparatus includes a hitch attachment demountably coupled to a mount attachment. The hitch attachment includes an arm having a first end, a second end positioned opposite the first end, a first lateral surface, a second lateral surface, a vertically oriented orifice. The first end is configured to be inserted into a trailer hitch receiver. A first plate is horizontally oriented and affixed to a top surface of the arm and positioned proximate to the second end. The mount attachment extends perpendicularly from the hitch attachment, includes a second plate as well as a stem, and is configured to demountably attach to an anchor platform. The stem is rotatably and demountably positioned within the vertically oriented orifice and secured therein via a fastener affixed to a bottom surface of the stem.

11 Claims, 11 Drawing Sheets

TRAILER HITCH MOUNTED APPARATUS

CROSS-REFERENCE TO RELATED APPLICATIONS

This application claims priority to U.S. Provisional Application No. 62/752,629 filed Oct. 30, 2018 and U.S. Design patent application Ser. No. 29/678,605 filed Jan. 30, 2019, which is hereby incorporated herein by reference.

FIELD OF THE INVENTION

The present invention relates generally to trailer hitches and specifically to trailer hitch mounted apparatuses.

BRIEF DESCRIPTION OF THE DRAWINGS

Some of the embodiments will be described in detail, with reference to the following figures, wherein like designations denote like members, wherein.

Figure 1:
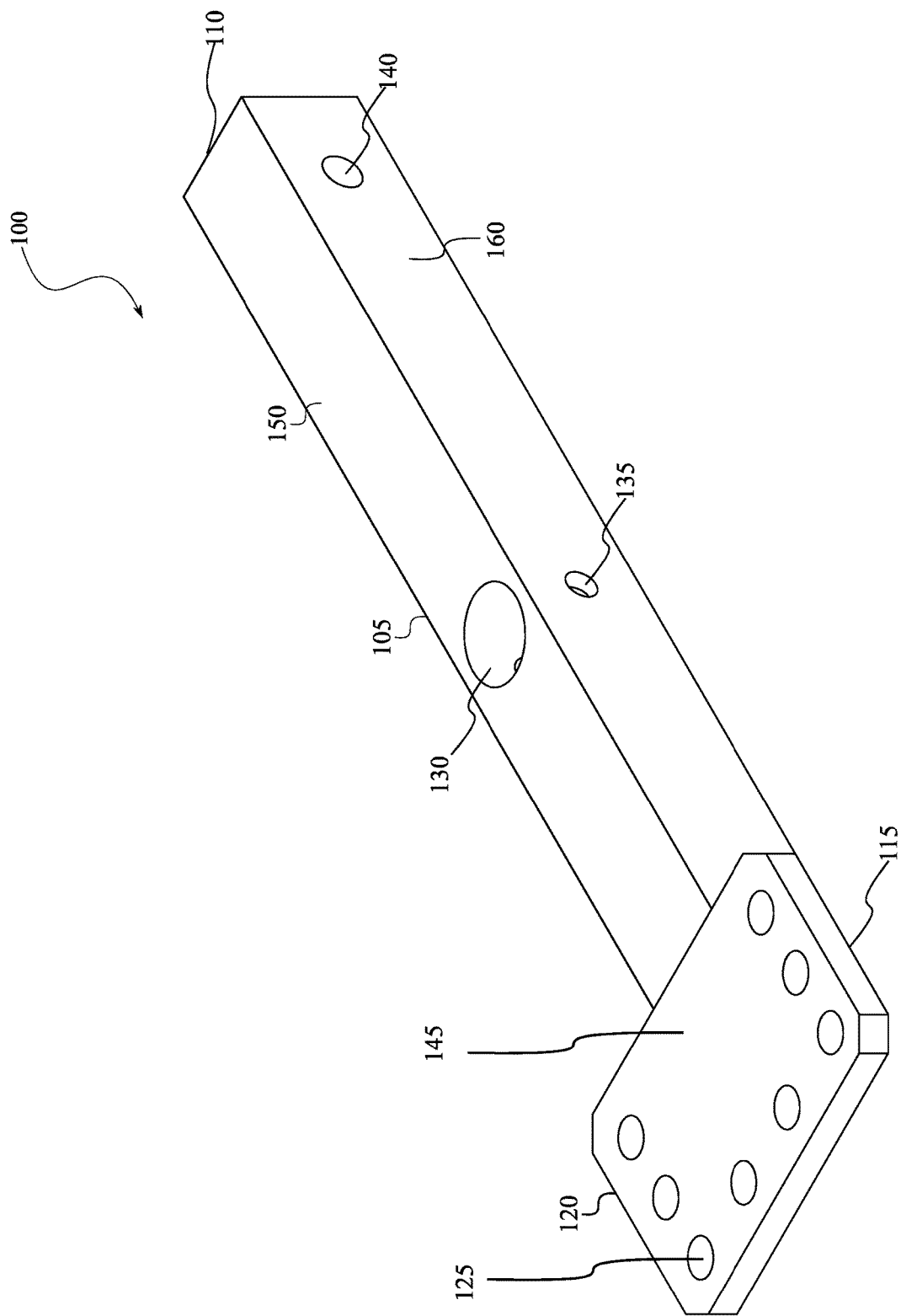
FIG. 1 illustrates a top front perspective view of a hitch attachment according to some embodiments.

Unless otherwise specifically noted, articles depicted in the drawings are not necessarily drawn to scale.

DETAIL DESCRIPTIONS OF THE INVENTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise. Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

Embodiments of the present disclosure, for example, are described above with reference to operational illustrations of apparatuses and systems according to embodiments of the disclosure. Embodiments conveyed herein seek to disclose hitch mounted apparatuses and systems. For example, the hitch mounted apparatus can include a hitch attachment coupled to a mount attachment. The hitch attachment can include an arm having a first end and a second end positioned opposite the first end. The first end can be configured to be inserted into a trailer hitch receiver. The first plate can be horizontally oriented and affixed to a top surface of the arm and positioned proximate to the second end. The mount attachment can extend perpendicularly from the hitch attachment and may comprise a second plate configured to demountably attach to an anchor platform. The system may include a trailer hitch receiver demountably coupled to the trailer hitch receiver.

A trailer hitch typically refers to device that may be attached to the chassis of a vehicle for towing. Receiver-type hitches typically consists of a portion that mounts to the frame of the vehicle that has a rearward-facing opening that can receive hitch mounted accessories. Trailer hitches typically include a receiver tube configured to receive hitch accessories. For example, Class I and II receiver tubes have a 31.8 mm diameter, Class III and IV receiver tubes have a 50.8 mm diameter, and Class V have a 50.8 mm or 63.5 mm receiver tube.

Fire departments as well as search and rescue teams are fixtures in modern society. At times, such entities may require specific tools to enable the safe movement of personnel, civilians, equipment, or a combination of two or more thereof. For example, Artificial High Directional (hereinafter "AHD") anchor systems are typically multipods (e.g., tripods, bipods, monopods, sideways bipods, lazy leg tripods, etc.) that can be configured to secure pulley systems as well as other equipment (e.g., anchoring equipment). AHD systems can include several leg pieces, foot pieces, and head assemblies made of lightweight metal material with significant loading capacity. AHD systems are typically known for their portability, which allow deployment in most environments. Even more, use of AHD systems typically afford teams increase control over the location and configuration thereof.

Embodiments disclosed herein seek to provide hitch mounted apparatuses (i.e. hitch mount 800). As discussed further below, hitch mount 800 can include hitch attachment 100 coupled to mount attachment 300. In other embodiments, hitch mount 800 or one or more components thereof can be formed using one or more metals (e.g., steel, aluminum, brass, an alloy, tin, zinc, copper, aluminum, iron, or a combination of two or more thereof), polymers, or a combination of two or more thereof.

Figure 2:
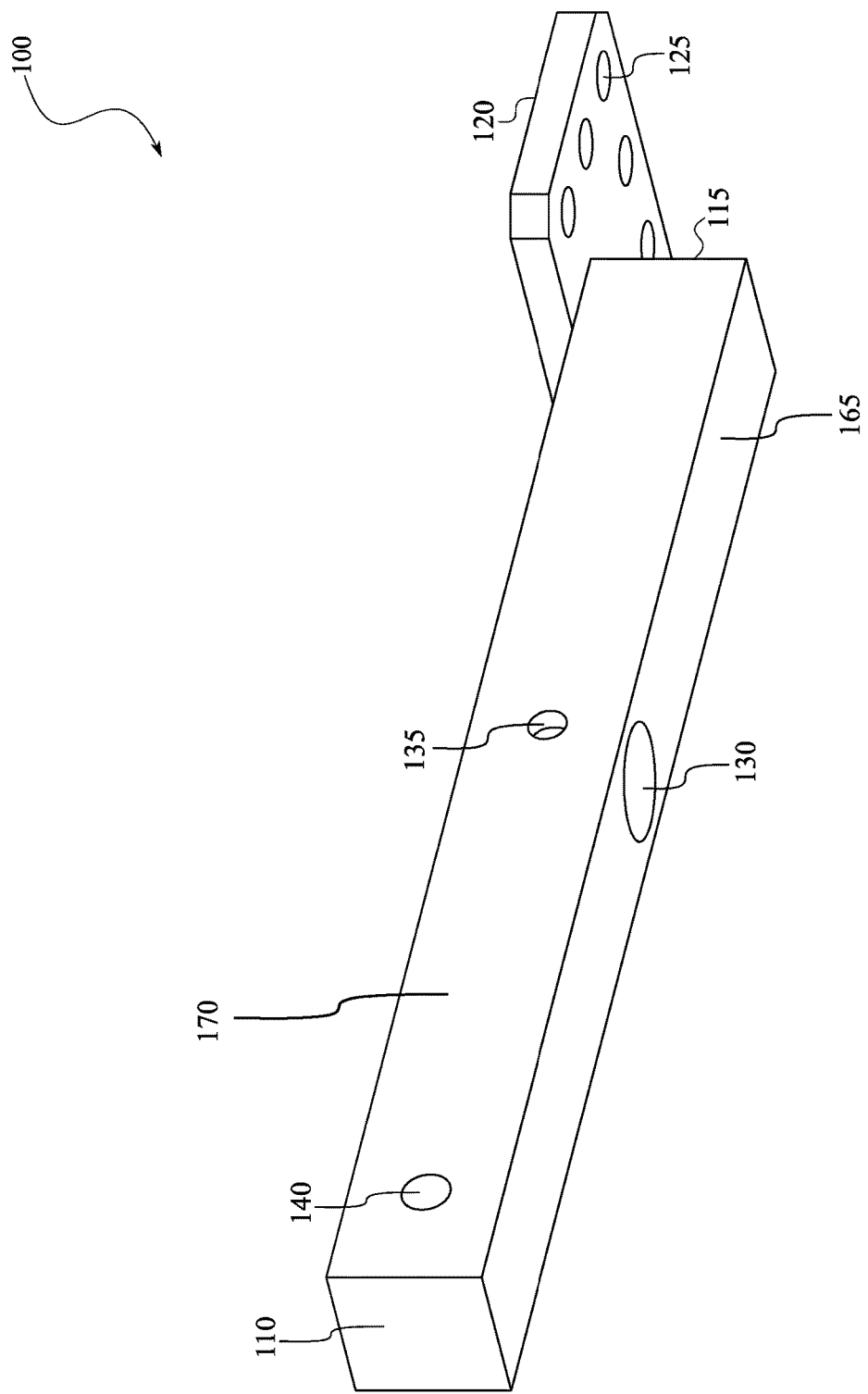
FIG. 2 illustrates a bottom rear perspective view of the hitch attachment according to some embodiments.
Figure 3:
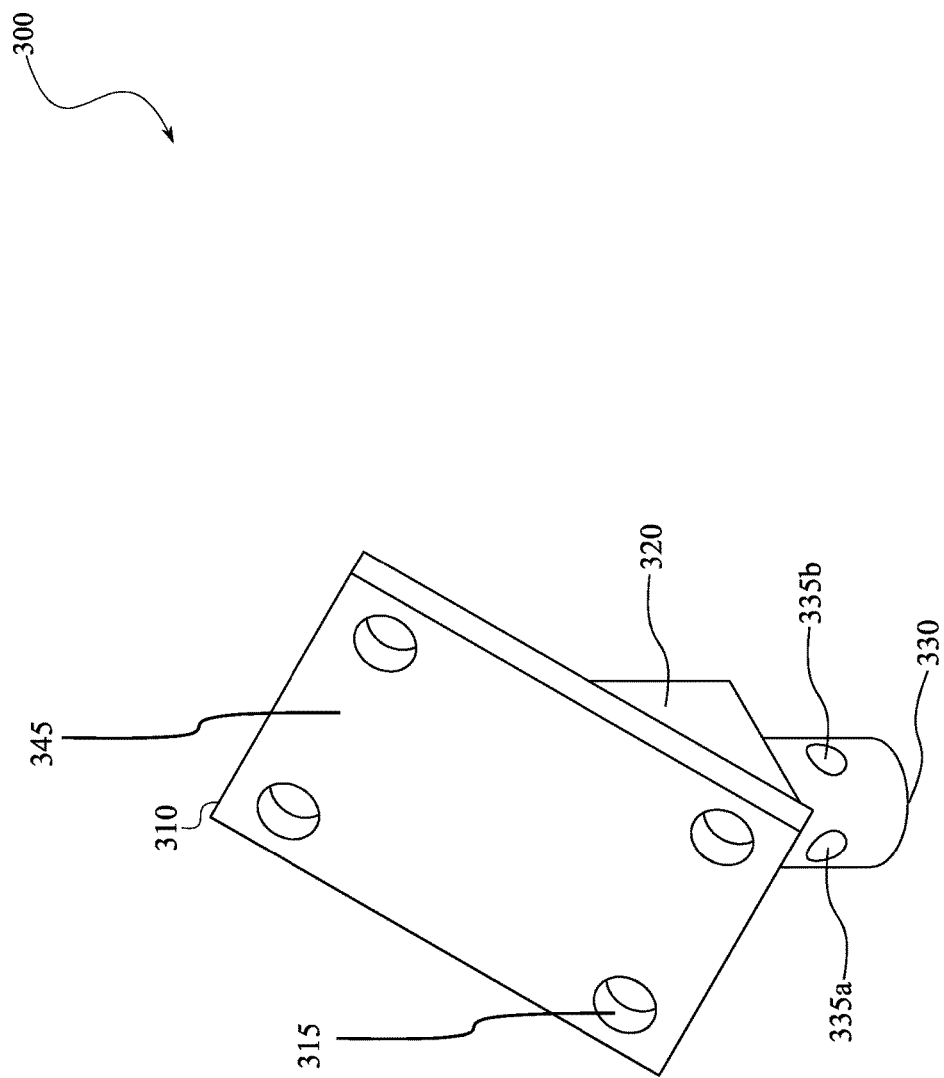
FIG. 3 illustrates a top front perspective view of a mount attachment according to other embodiments.
Figure 4:
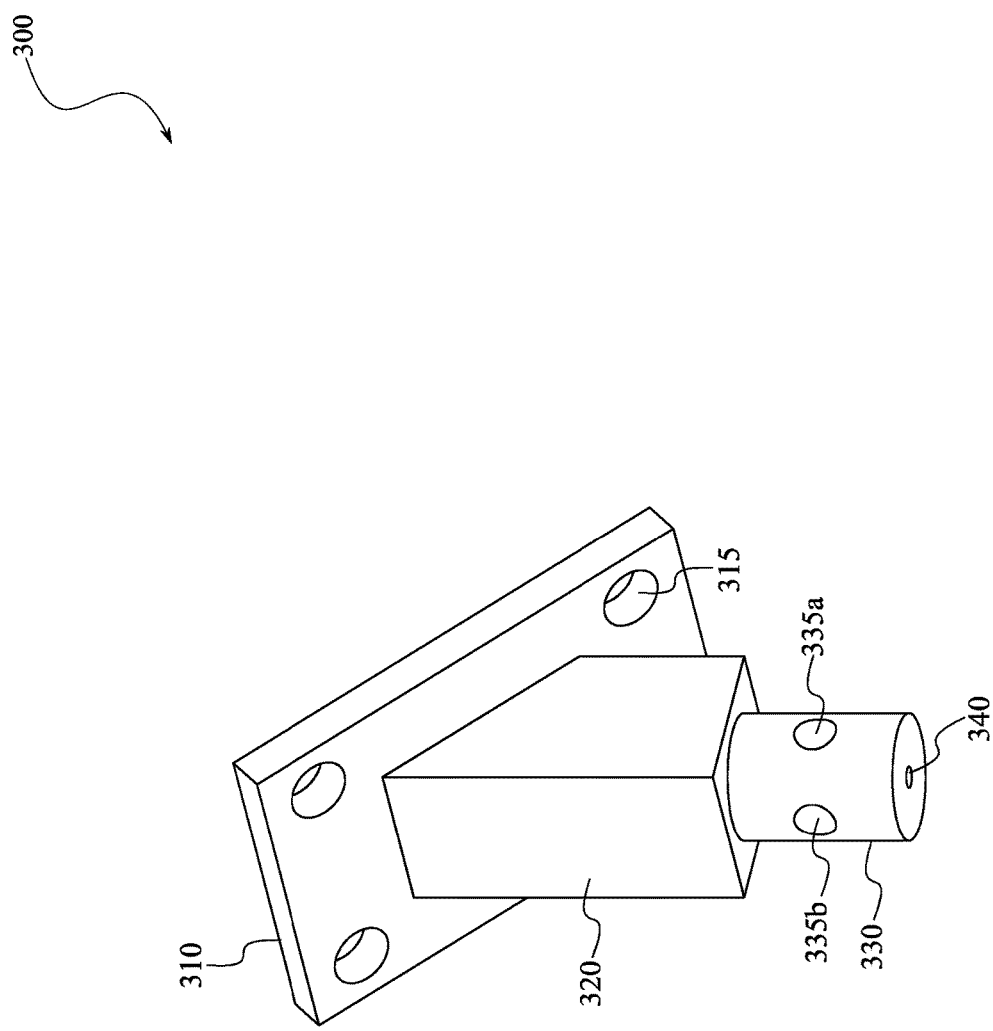
FIG. 4 illustrates a rear perspective view of the mount attachment according to other embodiments.
Figure 5:
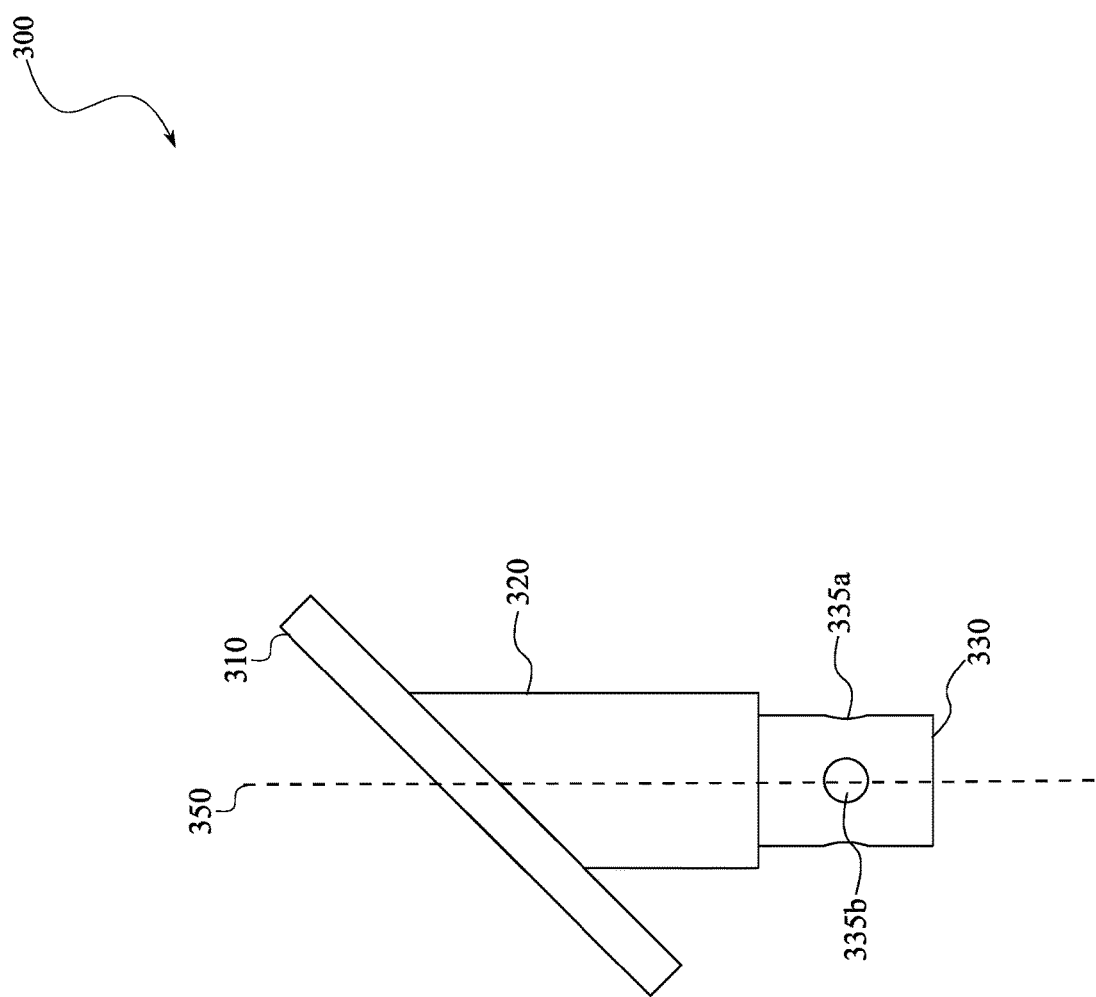
FIG. 5 illustrates a side view of the mount attachment according to other embodiments.
Figure 6:
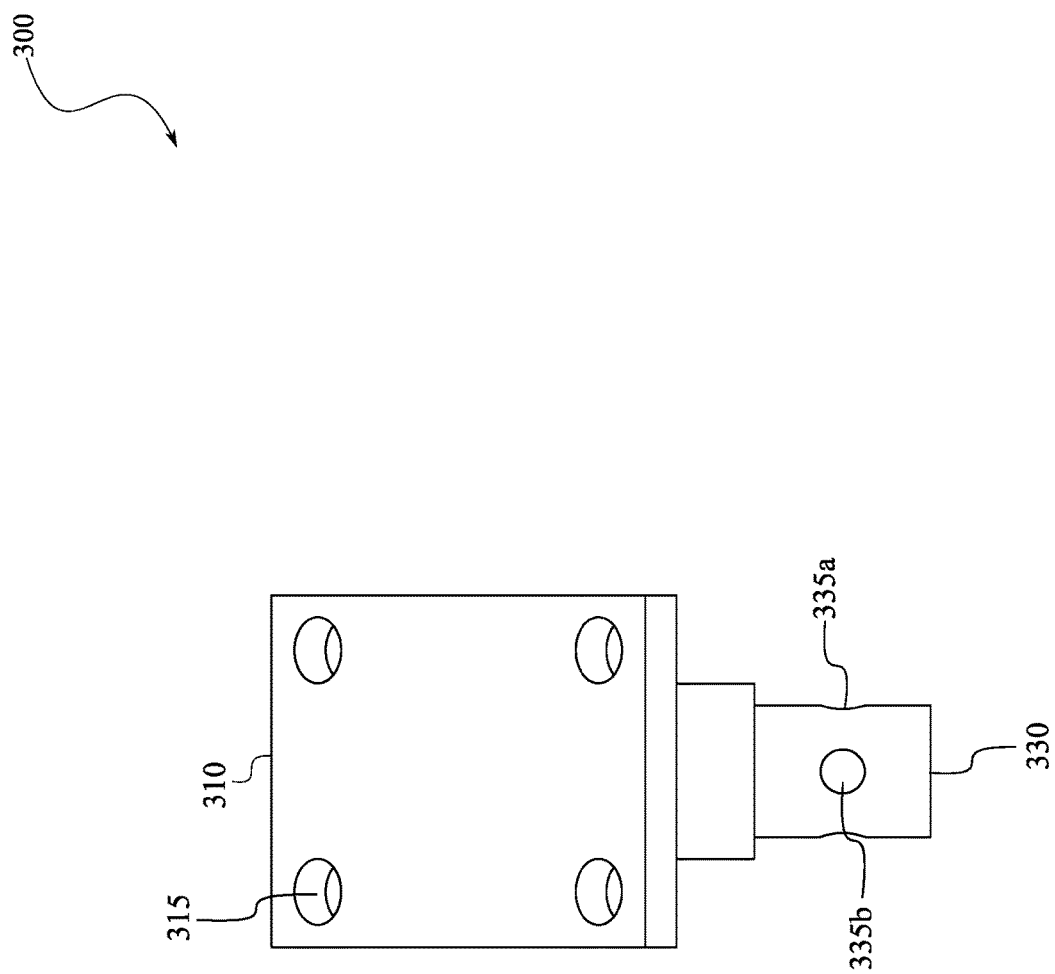
FIG. 6 illustrates a front view of the mount attachment according to certain embodiments.

Referring now to the figures. FIGS. 1 and 2 illustrate a perspective view of a hitch attachment, generally 100, according to certain embodiments. Some aspects of hitch attachment 100 can include arm 105. For example, arm 105 can be an elongated structure having end 110, end 115 (e.g., positioned opposite to end 110), lateral surface 160, lateral surface 170 (e.g., positioned opposite to lateral surface 160), top surface 150, and bottom surface 165 (e.g., positioned opposite top surface 150). Some aspects of arm 105 can be configured to reduce torsion about its longitudinal axis. In other embodiments, arm 105 can have a uniform cross-section. For example, arm 105 can have a hollow or solid cross-section. Other aspects of arm 105 can include at least one planar surface to reduce episodes of longitudinal twist about the longitudinal axis of arm 105. For example, arm 105 can have a cross-section that reduces episodes of longitudinal twist about its longitudinal axis (e.g., a solid cross-section). For example, arm 105 can have a polygonal cross-section, which can afford arm 105 an ability to resist shearing forces about its longitudinal axis and/or bending moments along its longitudinal axis. Some aspects of arm 105 can include one or more apertures having a dimension of 1.25 square inches, 2.0 square inches, or 2.5 square inches.

Figure 11:
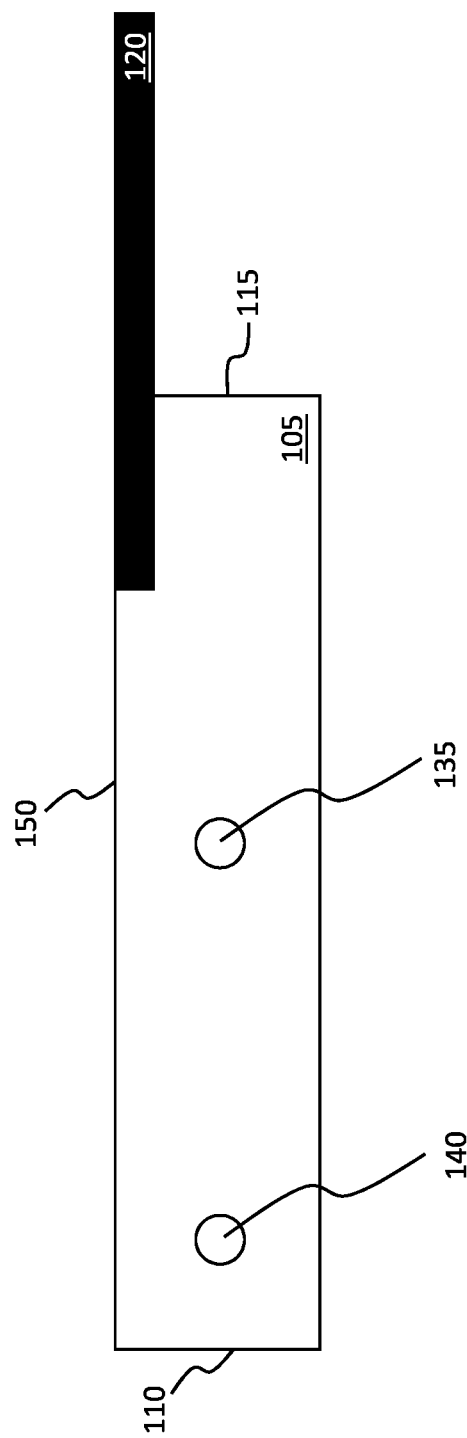
FIG. 11 illustrates a side view of a hitch attachment according to some embodiments.

In certain aspects, end 110 can be configured to demountably couple to a trailer hitch receiver (e.g., trailer hitch receiver 1020). In other aspects, plate 120 can be affixed to one or more surfaces (e.g., top surface 150, bottom surface 165, as well as lateral surfaces 160 and 170) of arm 105 and positioned proximate to end 115. For example, plate 120 can be a planar structure having longitudinal face 145, and at least one orifice 125 traversing through the longitudinal plane (e.g., completely traversing plate 120). In some embodiments, a plurality of orifice 125 can be positioned proximate to the periphery of plate 120. For example, orifice 125 can be an attachment (i.e. anchor) point configured to accommodate one or more components and/or structures, for example, pulleys, carabiners, ropes, as well as similar structures. In some embodiments, plate 120 can function in a similar manner as anchor plates and/or rigging plates (i.e. structures configured to aggregate a plurality of connections into a centralized point). In other aspects, plate 120 can be positioned on arm 105 to sit flush with top surface 150, as reflected in FIG. 11.

Aspects of arm 105 can include vertical orifice 130 that vertically traverses from top surface 150 to bottom surface 165 of arm 105. For example, vertical orifice 130 can have a diameter configured to receive mount attachment 300 (discussed below). Vertical orifice 130 can have a cylindraceous structure according to some aspects. Other aspects of vertical orifice 130 can have a polygonal structure. For example, vertical orifice 130 can have a structure that complements the structure of stem 330 (discussed below). Lateral surfaces 160 and 170 can each include lateral orifice 135 according to other embodiments. For example, lateral orifice 135 can extend horizontally from lateral surface 160 to lateral surface 170. Lateral orifice 135 can perpendicularly extend across (i.e., intersect) vertical orifice 130 according to some aspects. In other words, lateral orifice 135 can be perpendicularly oriented to vertical orifice 130. Lateral orifice 135 can have a diameter configured to receive a fastener (e.g., fastener 810 as well as similar elongated fasteners). In some aspects, horizontal orifice 140 can be positioned proximate to end 110. For example, horizontal orifice 140 can extend horizontally from lateral surface 160 to lateral surface 170.

Referring now to FIGS. 3-6. Aspects of mount attachment 300 can include stem 330, base 320 coupled to and positioned dorsal to stem 330, and plate 310 affixed to base 320. For example, stem 330 can be an elongated structure that can sit substantially flush within vertical orifice 130. Stem 330 can have a cylindraceous structure according to certain aspects. Other aspects of stem 330 can have a polygonal structure. For example, stem 330 can include horizontal orifices 335a and 335b that are coplanar and oriented perpendicular relative to each other. In other embodiments, horizontal orifices 335a or 335b can be configured to align with lateral orifices 135 when stem 330 is properly oriented and positioned within vertical orifice 130. Base 320 can have a polygonal structure where one surface can accommodate plate 310 according to still other aspects.

For example, base 320 can have at least one surface affixed to plate 310. Some aspects of base 320 include at least one surface having an angle of 10 degrees or more relative to frontal plane 350 affixed to plate 310 and thereby orient plate 310 at an angle of 10 degrees or more relative to frontal plane 350. For example, plate 310 can be a planar structure having longitudinal face 345 and at least one orifice 315 traversing the longitudinal plane (i.e., traversing plate 310). In some embodiments, a plurality of orifices 315 can be positioned proximate to the periphery of plate 310. Orifice 315 can be an attachment (i.e. anchor) point that can accommodate, for example, pulleys, carabiners, ropes, as well as similar structures. In some embodiments, plate 310 can function in a similar manner as anchor plates and/or rigging plates (i.e. structures configured to aggregate a plurality of connections into a centralized point).

Figure 7:
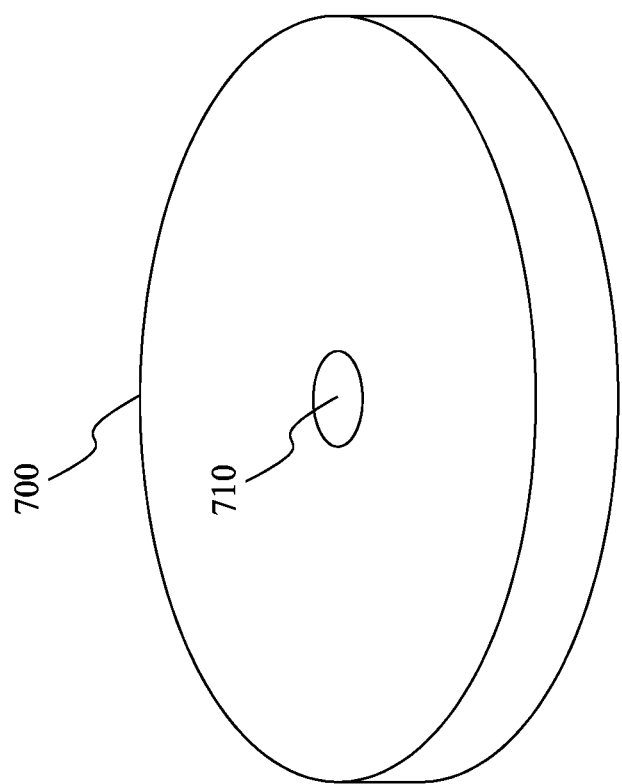
FIG. 7 illustrates a top perspective view of a cap according to certain embodiments.

Referring now to FIG. 7. In certain embodiments, washer 700 can be plate (e.g., disk-shaped) having centrally located orifice 710 that can distribute the load of a threaded fastener (e.g., bolt or nut). For example, centrally located orifice 710 can align with vertical orifice 340 positioned on the bottom surface of stem 330 (depicted in FIG. 4) when utilized to secure mount attachment 300 to hitch attachment 100. Centrally located orifice 710 and/or vertical orifice 340 can be threaded (e.g., having helical ridges complementary to threaded fasteners, such as screws and bolts) or non-threaded (i.e. having a smooth surface). Aspects of vertical orifice 340 can be oriented parallel with frontal plane 350 (i.e. vertical orifice 340 can be vertically oriented).

Figure 8:
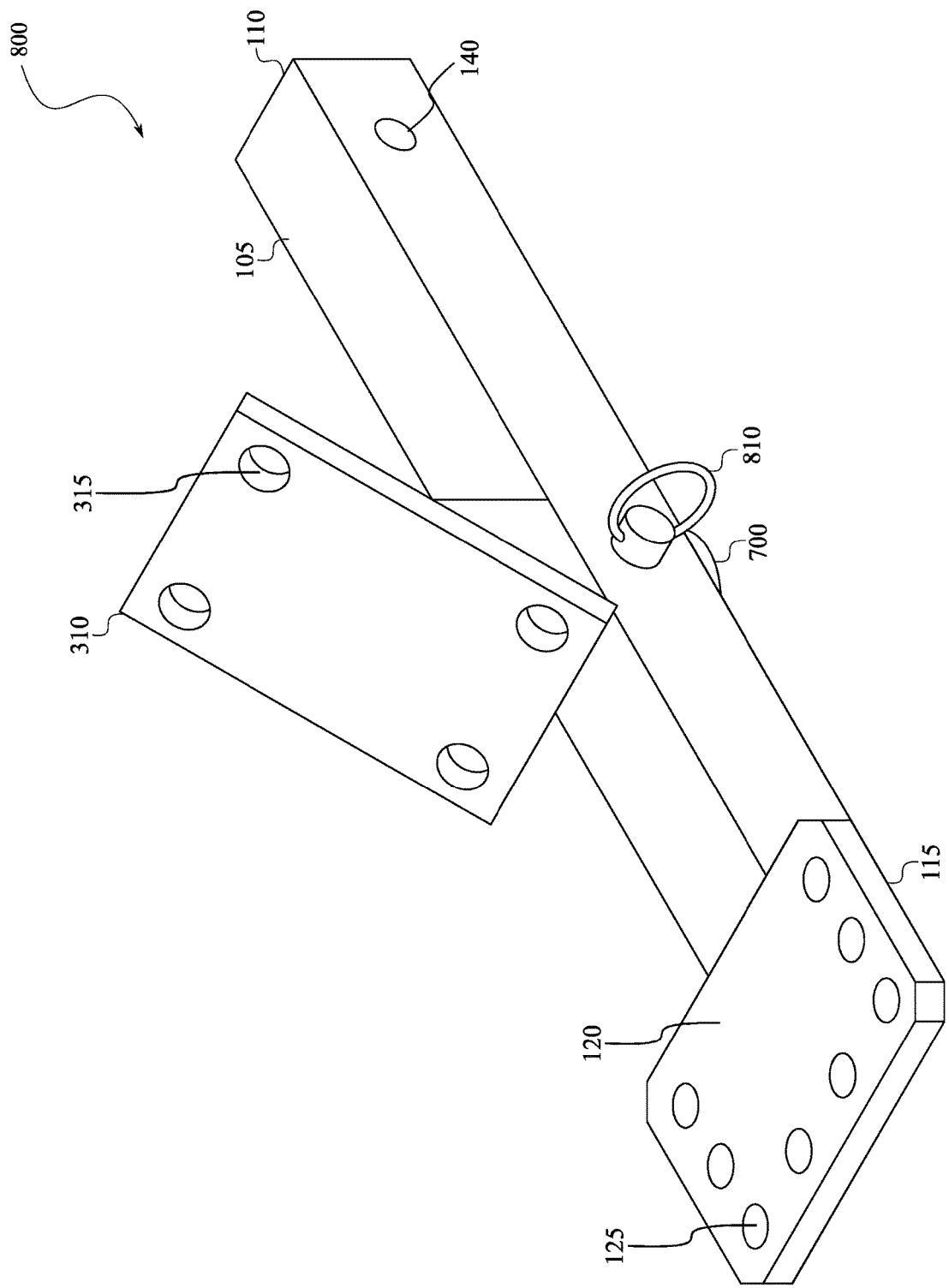
FIG. 8 illustrates a top front perspective view of a hitch mounted apparatus according to certain embodiments.
Figure 9:
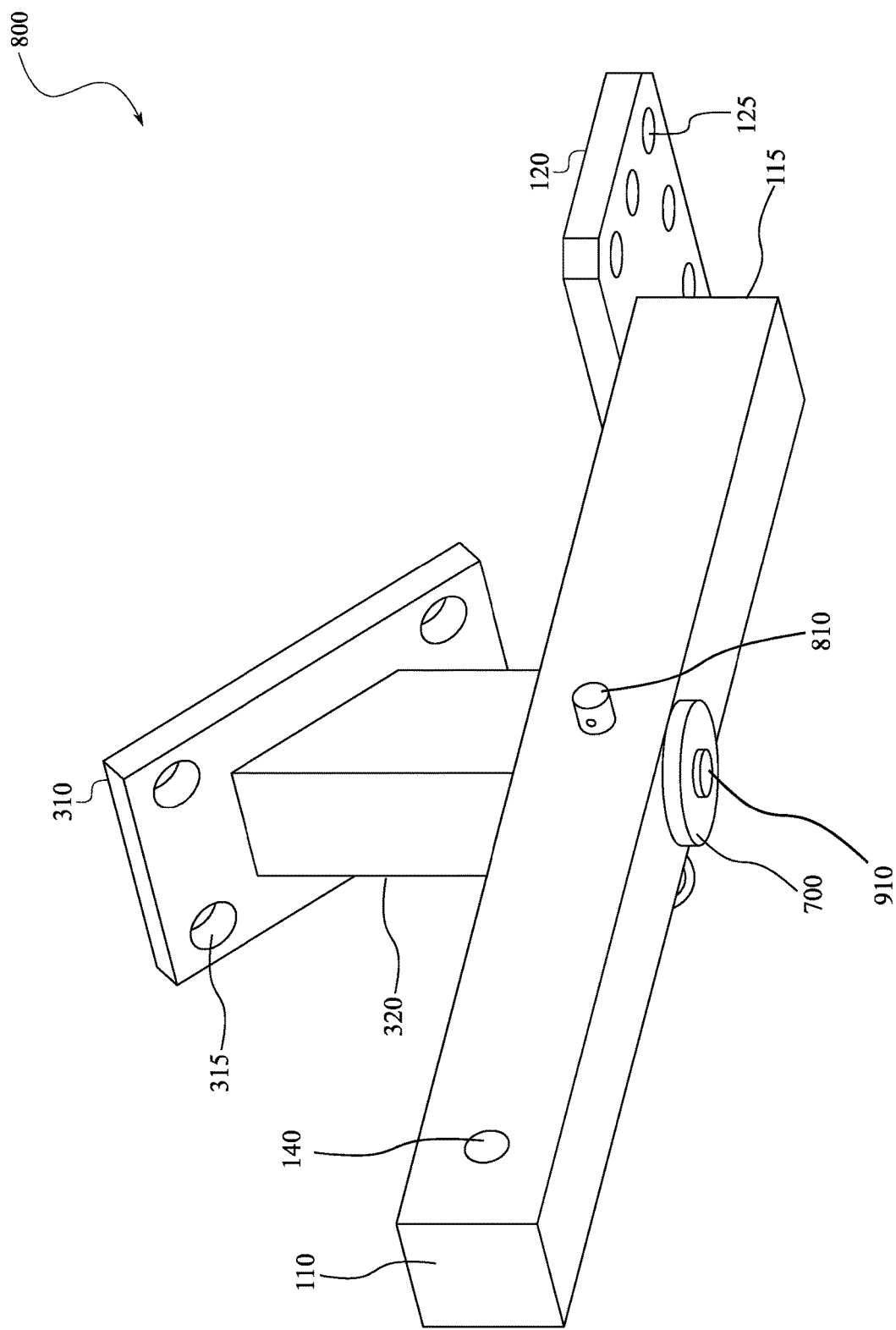
FIG. 9 illustrates a bottom rear perspective view of the hitch mounted apparatus according to certain embodiments.

FIGS. 8 and 9 depict a perspective view of hitch mount 800 according to yet still other embodiments. For example, assembly of hitch mount 800 can include positioning stem 330 of mount attachment 300 within vertical orifice 130 such that horizontal orifice 335a or 335b of mount attachment 300 aligns with lateral orifice 135 of hitch attachment 100. Some aspects of hitch mount 800 may necessitate that mount attachment 300 be secured to hitch attachment 100 via positioning fastener 810 positioned through horizontal orifices 335a or 335b (e.g., determined via desired alignment) and lateral orifice 135. Fastener 810 can be an elongated structure configured to traverse horizontal orifices 335a or 335b as well as lateral orifice 135 and thereby secure mount attachment 300 to hitch attachment 100 according to other aspects.

Figure 10:
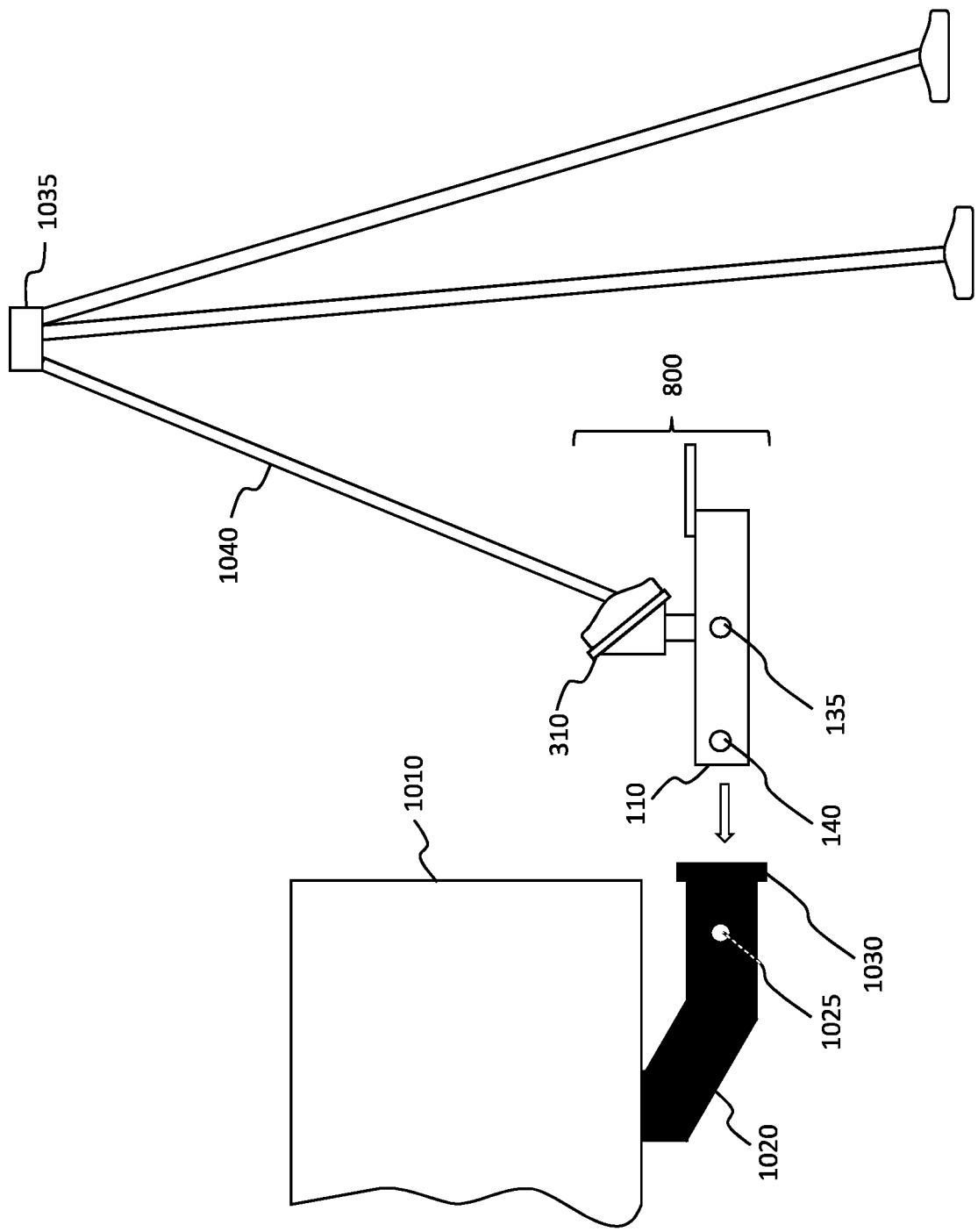
FIG. 10 depicts an embodiment of attaching the hitch mounted apparatus to a trailer hitch according to other embodiments.

For example, fastener 810 can be an elongated structure having a ball dent positioned at one end that depresses and springs back to facilitate insertion and removal of the structure. In certain embodiments, fastener 810 can be a cylindrical pin, tapered pin, groove pin, slotted spring pin, spirally coiled spring pin, clevis pin, cotter pin, spring pin, and split pin. For example, stem 330 can be secured within vertical orifice 130 by fastener 910 within orifice 710 of washer 700 and vertical orifice 340 of stem 330. In certain aspects, stem 330 may be rotatably coupled to washer 700. Fastener 910 can be a screw, rod, any hardware that can mechanically join or affix two or more objects together according to yet still other aspects. FIG. 10 depicts an exemplary of attaching hitch mount 800 to trailer hitch receiver 1020 according to other embodiments.

For example, to secure hitch mount 800 to trailer hitch receiver 1020 affixed to the rear portion of vehicle 1010, end 110 can be positioned within trailer hitch receiver tube 1030 to thereby align receiver orifices 1025 (e.g., positioned on each side of trailer hitch receiver tube 1030) with horizontal orifices 140. Trailer hitch receiver tube 1030 can include one or more apertures having a dimension of 1.25 square inches, 2.0 square inches, or 2.5 square inches to receive arm 105 (as disclosed herein) according to certain embodiments. In other aspects, vehicle 1010 can be an automotive vehicle (e.g., a car, a bus, light truck, off-road vehicle, a lorry, or similar terrestrial vehicles propelled by an internal combustion engine and/or electric motor). Subsequently, an elongated fastener (e.g., a pin) may be positioned through receiver orifices 1025. In some aspects, an elongated fastener (e.g., similar to fastener 810) can be positioned through receiver orifices 1025 and horizontal orifices 140 to thereby secure hitch mount 800 to trailer hitch receiver 1020.

For example, anchor platform 1035 can be a tripod having three leg components 1040 attached at their proximal ends. One of the leg components 1040 can be rotatably and/or demountably coupled to plate 310 at its distal end. In certain aspects, anchor platform 1035 can be a multipod. In other aspects, anchor platform 1035 can be an Artificial High Directional (hereinafter "AHD") anchor system. Not to be limited by theory, hitch mount 800 can enable rescue personnel (e.g., officers and employees of fire departments, fire protection agencies, search and rescue teams, as well as similar organizations) to set up AHD anchor systems faster compared to the process when hitch mount 800 is not utilized. Even more, when hitch mount 800 is coupled to vehicle 1010, hitch mount 800 can provide increased stability to anchor platform 1035. The increased stability can enhance the speed of recovery of victims/person (e.g., from steep environments).

Embodiments of the present disclosure, for example, are described above with reference to operational illustrations of apparatuses and systems according to embodiments of the disclosure. Embodiments conveyed herein seek to disclose hitch mounted apparatuses and systems. In certain embodiments, the hitch mounted apparatus can include hitch attachment 100 coupled to mount attachment 300. Hitch attachment 100 can include arm 105. Arm 105 can include first end 110 and second end 115 positioned opposite first end 110. First end 110 can be configured to be inserted into trailer hitch receiver 1020. The first plate (e.g., plate 120) can be horizontally oriented and affixed to top surface 150 of arm 105 and positioned proximate to second end 115. Mount attachment 300 can extend perpendicular from hitch attachment 100 and may comprise a second plate (e.g., plate 310) configured to demountably attach to anchor platform 1035.

Arm 105 can be hollow or solid. The first plate can include orifice 125 positioned proximate to the periphery of the first plate and traversing through longitudinal face 145 of the first plate. The second plate can include orifice 315 positioned proximate to a periphery of the second plate and traversing through longitudinal face 345 of the second plate. Arm 105 can include top surface 150, a bottom surface 165 positioned opposite to top surface 150, vertical orifice 130 vertically traversing arm 105 from top surface 150 to bottom surface 165. Mount attachment 300 can include stem 330 positioned within the vertical orifice 130 and thereby can be rotatably and demountably coupled to hitch attachment 100.

Mount attachment 300 can include stem 330 and base 320 coupled to and positioned dorsal to stem 330. The second plate can be affixed to a surface of base 320. Mount attachment 300 can include stem 330 and base 320 coupled to and positioned dorsal to stem 330. The second plate may be affixed to a surface of base 320 at an angle of 10 degrees or more relative to frontal plane 350 of stem 330 or base 320. Arm 105 can include top surface 150, bottom surface 165, first lateral surface (e.g., lateral surface 160), second lateral surface (e.g., lateral surface 170) positioned opposite to the first lateral surface. A vertically oriented orifice (e.g., vertical orifice 130) may traverse top surface 150 and bottom surface 165 of arm 105. A horizontally oriented orifice (e.g., horizontal orifice 140) can be positioned coplanar with the vertically oriented orifice and may traverse lateral surface 160 and lateral surface 170. Mount attachment 300 can include stem 330 rotatably and demountably positioned within the vertically oriented orifice and secured within the vertically oriented orifice via fastener 910 that can traverse the horizontally oriented orifice and a horizontal orifice 340 of the stem.

Mount attachment 300 can include stem 330 demountably positioned within the vertically oriented orifice and rotatably mounted within the vertically oriented orifice via fastener 910 affixed to a surface of stem 330. Anchor platform 1035 may include a tripod. The second plate may be configured to demountably attach to a leg of the tripod.

Although the invention has been explained in relation to its preferred embodiment, it is to be understood that many other possible modifications and variations can be made without departing from the spirit and scope of the invention. Although specific advantages have been enumerated above, various embodiments may include some, none, or all of the enumerated advantages.

What is claimed is:

1. A trailer hitch mounted apparatus comprising:
   a hitch attachment comprising:
      an arm comprising:
         a first end configured to be inserted into a trailer hitch receiver;
         a second end positioned opposite the first end;
         a first plate horizontally oriented and affixed to a top surface of the arm and positioned proximate to the second end;
         a bottom surface positioned opposite to the top surface;
         a first lateral surface;
         a second lateral surface positioned opposite to the first lateral surface;
         a vertically oriented orifice traversing the top surface and the bottom surface of the arm;
   a mount attachment extending perpendicular from the hitch attachment and comprising:
      a second plate configured to demountably attach to an anchor platform;

a stem rotatably and demountably positioned within the vertically oriented orifice and secured within the vertically oriented orifice via a fastener affixed to a bottom surface of the stem;

the anchor platform comprises a tripod; and the second plate is configured to demountably attach to a leg of the tripod.

2. The hitch mounted apparatus of claim 1, wherein the first plate comprises an orifice positioned proximate to a periphery of the first plate and traversing through a longitudinal face of the first plate.

3. The trailer hitch mounted apparatus of claim 1, wherein the second plate comprises an orifice positioned proximate to a periphery of the second plate and traversing through a longitudinal face of the second plate.

4. The trailer hitch mounted apparatus of claim 1, wherein the mount attachment comprises a base coupled to and positioned dorsal to the stem; and the second plate is affixed to the base.

5. The hitch mounted apparatus of claim 1, wherein the mount attachment comprises a base coupled to and positioned dorsal to the stem; and the second plate is affixed to a surface of the base at an angle of 10 degrees or more relative to a frontal plane of one or more of the stem and base.

6. The trailer hitch mounted apparatus of claim 1, wherein the arm comprises a first horizontally oriented orifice positioned coplanar with the vertically oriented orifice and traversing the arm from the first lateral surface to the second lateral surface; and the stem further secured within the vertically oriented orifice via a fastener that traverses the first horizontally oriented orifice and a horizontal orifice of the stem.

7. The trailer hitch mounted apparatus of claim 1, wherein the arm comprises a second horizontally oriented orifice positioned proximate to the first end and traversing the arm from the first lateral surface to the second lateral surface.

8. A trailer hitch mounted apparatus comprising:

a hitch attachment comprising:

an arm comprising:

a first end configured to be inserted into a trailer hitch receiver;

a second end positioned opposite the first end;

a first plate horizontally oriented and affixed to a top surface of the arm and positioned proximate to the second end;

a bottom surface positioned opposite to the top surface;

a first lateral surface;

a second lateral surface positioned opposite to the first lateral surface;

a vertically oriented orifice traversing the top surface and the bottom surface of the arm;

a mount attachment extending perpendicular from the hitch attachment and comprising:

a second plate configured to demountably attach to an anchor platform;

a stem rotatably and demountably positioned within the vertically oriented orifice and secured within the vertically oriented orifice via a fastener affixed to a bottom surface of the stem;

a base coupled to and positioned dorsal to the stem;

wherein the second plate is affixed to a surface of the base at an angle of 10 degrees or more relative to a frontal plane of one or more of the stem and base;

the anchor platform comprises a tripod; and the second plate is configured to demountably attach to a leg of the tripod.

9. The hitch mounted apparatus of claim 8, wherein the first plate comprises an orifice positioned proximate to a periphery of the first plate and traversing through a longitudinal face of the first plate.

10. The hitch mounted apparatus of claim 8, wherein the second plate comprises an orifice positioned proximate to a periphery of the second plate and traversing through a longitudinal face of the second plate.

11. The trailer hitch mounted apparatus of claim 8, wherein the arm comprises a second horizontally oriented orifice positioned proximate to the first end and traversing the arm from the first lateral surface to the second lateral surface.

* * * * *